Jan. 16, 1934.   A. W. MALL   1,943,980
SPINDLE CONNECTER
Filed June 22, 1932
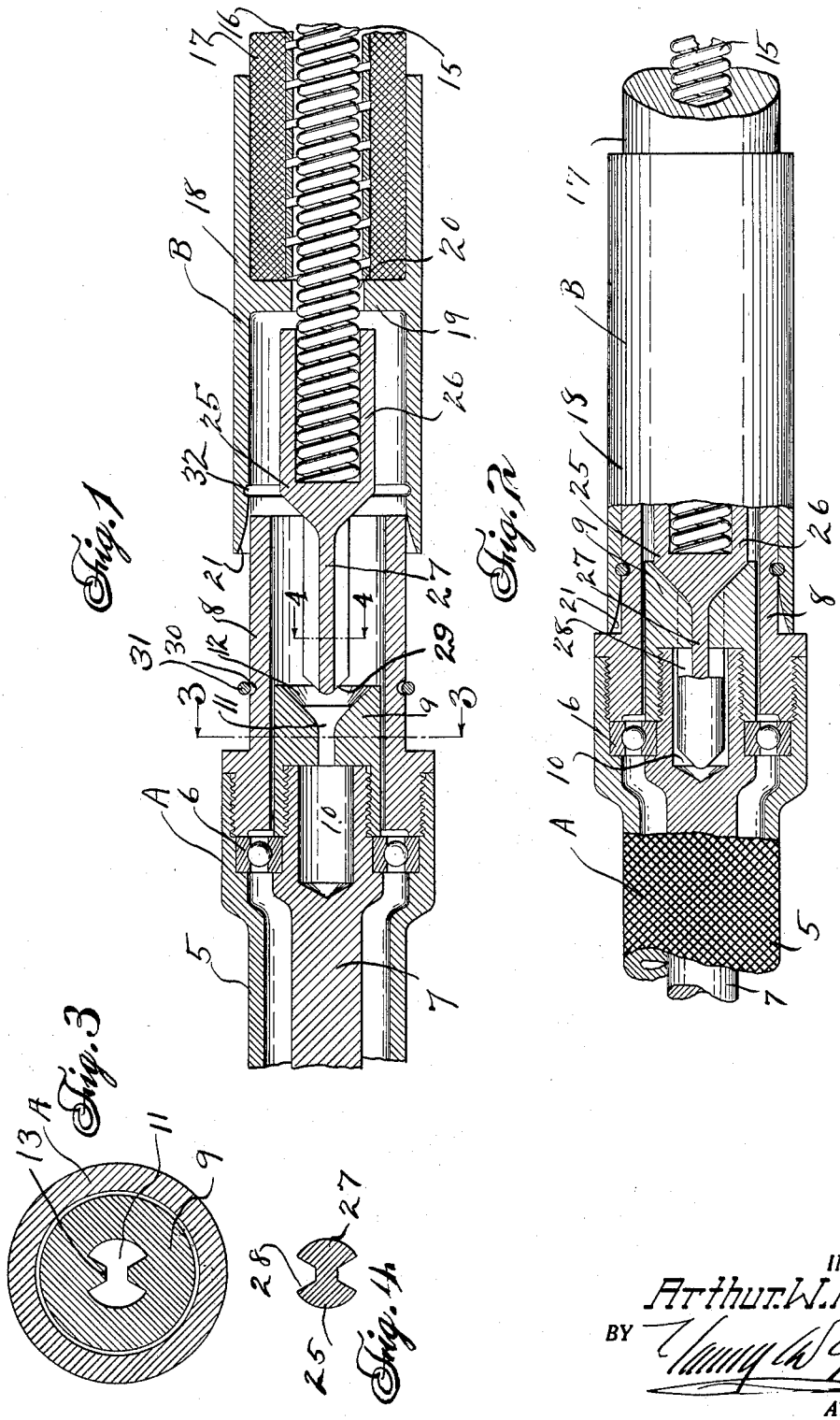
INVENTOR.
Arthur W. Mall
BY
ATTORNEY.

Patented Jan. 16, 1934

1,943,980

UNITED STATES PATENT OFFICE 1,943,980

SPINDLE CONNECTER

Arthur W. Mall, Chicago, Ill.

Application June 22, 1932. Serial No. 618,685

3 Claims. (64—30)

This invention appertains to power driven tools, and more particularly to a novel coupling for uniting a driven tool attachment with a flexible drive shaft.

One of the primary objects of my invention is the provision of a novel coupling, so constructed that the spindle of a driven tool can be readily connected to a flexible shaft, the spindle socket and the core tip being so formed as to permit the spindle to be gradually set in rotation by the core tip, until the spindle and the core tip rotate at an even rate of speed, at which time the free insertion of the core tip into the socket of the spindle is permitted.

Another prime object of my invention is the provision of novel means for forming the core tip of the flexible shaft and the socket of the spindle, so that the drive on the core tip and socket will be equally distributed, whereby to facilitate the steady rotation of the tool spindle without undue strain, and whereby the liability of breakage of the core tip and the spindle will be reduced to a minimum.

A further object of my invention is the provision of novel means for detachably locking the spindle shell of a tool with the casing sleeve of the flexible drive shaft after the core tip of the drive shaft has entered in the socket of the tool spindle, whereby accidental displacement of the parts will be eliminated.

A still further object of my invention is to provide a novel coupling of the above character, which will possess a maximum amount of strength and which can be manufactured at a low cost.

With these and other objects in view, the invention consists in the novel construction, arrangement and formation of parts, as will be hereinafter more specifically described, claimed and illustrated in the accompanying drawing:

Figure 1 is a fragmentary longitudinal section illustrating my novel coupling showing the parts partly separated;

Figure 2 is a similar view showing the parts in their fully connected position;

Figure 3 is a detail transverse section taken on the line 3—3 of Figure 1, looking in the direction of the arrows, illustrating the formation of the socket;

Figure 4 is a detail transverse section taken on the line 4—4 of Figure 1, illustrating the construction of the core tip.

Referring to the drawing in detail wherein similar reference characters designate corresponding parts throughout the several views, the letter "A" indicates a fragment of a rotary tool and "B" the drive end of a flexible shaft constructed in accordance with my invention.

The tool "A" can be considered of any preferred type, and as shown, the same embodies a spindle shell 5 which rotatably supports through the medium of a bearing 6, the tool spindle shaft 7. The inner end of the spindle shell 5 is threaded on the supporting sleeve or tubular casing 8, which acts to hold the bearing 6 in position. The inner end of the spindle shaft 7 can have threaded thereon the drive nut 9, which is of special construction, as will be later described. The inner end of the spindle shaft 7 is provided with an axial bore 10 and the drive nut 9 is provided with a similar axial bore 11 for communicating therewith. This bore 11 gradually flares outwardly toward the inner end thereof to provide a wide entrance mouth 12. The bore 11 of the drive nut 9 is provided at diametrically opposed points, with longitudinal extending substantially V-shaped ribs 13, for a purpose which will also be hereinafter described. It is to be noted that the tubular sleeve or casing 8 extends a material distance beyond the feed nut 9.

The flexible shaft "B" comprises a rotatable flexible driven core 15, which as shown, consists of a coil spring construction. This rotatable flexible core 15 is mounted in a flexible tube 16, which forms a bearing for the core and the flexible tubing is preferably covered by a suitable flexible casing 17 formed of rubber or the like. The core 15 extends beyond the flexible casings 16 and 17. The forward end of the casings 16 and 17 are received within the rigid casing sleeve or ferrule 18, which is preferably provided with a transverse partition 19 having an axial opening 20 through which the core 15 extends.

In accordance with my invention, the forward end of the casing sleeve or ferrule is flared as at 21, so as to facilitate the insertion of the tubular sleeve 8 of the tool "A" into the same.

The projecting portion of the core 15 receives the drive core tip 25 which forms an important part of my invention. As shown, the inner end of the core tip is provided with a socket 26 for receiving the forward end of the flexible core 15 and the core is secured in the socket in any preferred way.

Extending forwardly from the core receiving socket 26, is the drive shank 27 of the core tip. This shank 27 is of a substantially circular shape in cross section, but is provided on opposite sides with the longitudinally extending grooves or guideways 28 which are of a substantially V-shape in cross section. The extreme forward end of the shank 27 is of a wedge shape as at 29 to provide a leading end so as to facilitate the insertion thereof into the bore or socket 11 of the drive nut 9.

It is obvious, from the foregoing, that when it is desired to connect the tool "A" with the flexible drive shaft "B", that it is merely necessary to slide the tubular sleeve 8 into the casing or ferrule 18 of the drive shaft. Owing to the shape of the drive nut and the shank of the core tip, these parts will be readily guided into engagement with one another.

In view of the fact that the core tip is provided on opposite sides with the longitudinal ways 28 and the socket or bore of the drive nut 9 is provided with the ribs, that the engagement of the tip with the drive nut will gradually set the drive nut and the spindle shaft 7 in motion. When the tip first engages the drive nut, the speed of the core tip tends to throw the tip away from the drive nut, but as the drive nut and the shaft 7 gradually picks up speed, the tip can be readily inserted within the drive nut and the bore 10 of the drive shaft 7. The provision of the tip 25 with its longitudinal ways 28 on its opposite sides and the formation of the opposed ribs 13 in the bore of the drive nut constitute an important step forward in this art, in that the double slotted core tip is evenly balanced and therefore makes the flexible core run much more smoothly than is possible in the practice now commonly used, where a single side of core tip is flat or slotted.

The entire arrangement is that it makes it possible to quickly change the various attachments or tools on the end of the revolving flexible shaft without stopping the electric motor or gasoline engine driving the same.

In order to prevent the accidental displacement of the parts after the same have been clamped together, the outer face of the tubular sleeve 8 can be provided with an annular groove 30 of substantially semi-circular shape in cross section for receiving the split resilient locking ring 31 which is adapted to snap in a similar annular groove 32 formed in the inner face of the casing sleeve or ferrule 18.

Changes in details may be made without departing from the spirit or the scope of my invention, but what I claim as new is:

1. The combination with a flexible drive shaft having a rigid casing at its driving end and a flexible rotatable core extending into the casing, of an interchangeable attachment for the flexible drive shaft including a tubular sleeve for insertion in the casing, a rotatable spindle shaft projecting partially into the outer sleeve provided with a socket, and a drive tip for the core rigidly connected with the core extending beyond the casing, the core tip and the socket being provided with mating longitudinal ribs and grooves on their opposite faces, the socket having a flared entrance mouth and the core tip being provided with a wedge-shaped leading end.

2. The combination with a flexible drive shaft including a flexible rotatable core and a rigid casing at one end of the shaft rotatably receiving the core, of a detachable implement for connection with the drive shaft including a spindle shell, a spindle shaft rotatably mounted in the shell having an axial bore at one end, a drive socket connected with the spindle shaft, a tubular sleeve secured to the spindle shell and projecting beyond the socket for insertion in the casing of the flexible shaft, the casing of the flexible shaft having a flared entrance mouth, and a core tip for the core having a socket for receiving the core and a shank projecting beyond the casing, the socket of the attachment and the shank of the tip being provided with mating longitudinally extending grooves and ribs, the socket being further provided with a flared entrance mouth and the tip being provided with a wedge-shaped leading end.

3. The combination with a flexible drive shaft including a flexible rotatable core and a rigid casing at one end of the shaft rotatably receiving the core, of a detachable implement for connection with the drive shaft including a spindle shell, a spindle shaft rotatably mounted in the shell having an axial bore at one end, a drive socket connected with the spindle shaft, a tubular sleeve secured to the spindle shell and projecting beyond the socket for insertion in the casing of the flexible shaft, the casing of the flexible shaft having a flared entrance mouth, and a core tip for the core having a socket for receiving the core and a shank projecting beyond the casing, the socket of the attachment and the shank of the tip being provided with mating longitudinally extending grooves and ribs, the socket being further provided with a flared entrance mouth and the tip being provided with a wedge-shaped leading end, and means for detachably locking the attachment to the casing including annular grooves formed respectively in the outer face of the tubular sleeve and the inner face of the casing and a resilient split ring normally received in one of said grooves for detachable engagement in the other of said grooves.

ARTHUR W. MALL.